(12) United States Patent
Beaufort et al.

(10) Patent No.: US 10,806,091 B2
(45) Date of Patent: Oct. 20, 2020

(54) WEIGHING DEVICE AND HARVEST COLLECTING APPARATUS

(71) Applicant: DEERE & COMPANY, Moline, IL (US)

(72) Inventors: David M. Beaufort, Arc les Gray (FR); Maxime Blanchet, Bricquebosq (FR)

(73) Assignee: DEERE & COMPANY, Moline, IL (US)

( * ) Notice: Subject to any disclaimer, the term of this patent is extended or adjusted under 35 U.S.C. 154(b) by 160 days.

(21) Appl. No.: 16/116,588

(22) Filed: Aug. 29, 2018

(65) Prior Publication Data
US 2019/0069493 A1 Mar. 7, 2019

(30) Foreign Application Priority Data
Sep. 4, 2017 (DE) .................. 10 2017 215 438

(51) Int. Cl.
| G01G 7/00 | (2006.01) |
| G01G 19/52 | (2006.01) |
| G01L 1/12 | (2006.01) |
| A01F 15/08 | (2006.01) |

(52) U.S. Cl.
CPC .......... *A01F 15/0833* (2013.01); *G01G 7/00* (2013.01); *G01G 19/52* (2013.01); *G01L 1/12* (2013.01); *A01F 2015/0891* (2013.01)

(58) Field of Classification Search
CPC ...... G01G 23/005; G01G 19/08; G01G 19/12; G01G 7/00; G01G 19/52; G01L 1/12; A01F 2015/0891; A01F 15/0833
See application file for complete search history.

(56) References Cited

U.S. PATENT DOCUMENTS

| 3,857,452 A * | 12/1974 | Hartman | G01G 3/1404 177/139 |
| 5,020,381 A * | 6/1991 | Bartlett | G01L 5/0019 73/862.471 |
| 5,831,222 A * | 11/1998 | Fanger | B66C 13/16 177/147 |
| 6,122,979 A * | 9/2000 | Tsuchie | G01G 19/12 73/862.622 |
| 6,338,281 B1* | 1/2002 | El-Ibiary | G01L 5/0019 73/862.381 |
| 6,769,315 B2* | 8/2004 | Stevenson | G01G 19/12 73/794 |
| 7,064,282 B2* | 6/2006 | Viaud | A01F 15/0833 177/136 |
| 7,997,154 B2* | 8/2011 | Oguma | F16C 19/186 73/862.541 |
| 9,494,556 B2* | 11/2016 | May | G01D 5/145 |

(Continued)

FOREIGN PATENT DOCUMENTS

| EP | 1480025 A1 | 11/2004 |
| EP | 3106020 A1 | 12/2016 |

OTHER PUBLICATIONS

Computer translation of EP3106020 from the EPO website, downloaded Mar. 31, 2020.*

(Continued)

*Primary Examiner* — Randy W Gibson

(57) ABSTRACT

A weighing device for detecting the weight force of a pressed bale on a roll includes a bearing device of the roll. At least one weighing means is integrally disposed in the bearing device.

6 Claims, 5 Drawing Sheets

(56) References Cited

U.S. PATENT DOCUMENTS

| | | | |
|---|---|---|---|
| 10,036,663 B2* | 7/2018 | Smith | A01F 15/0875 |
| 10,151,342 B2* | 12/2018 | Heim | F16C 35/077 |
| 2019/0203773 A1* | 7/2019 | Den Haak | F16C 19/361 |

OTHER PUBLICATIONS

European Search Report issued in counterpart application No. 18191754.3 dated Jan. 25, 2019. (8 pages).

* cited by examiner

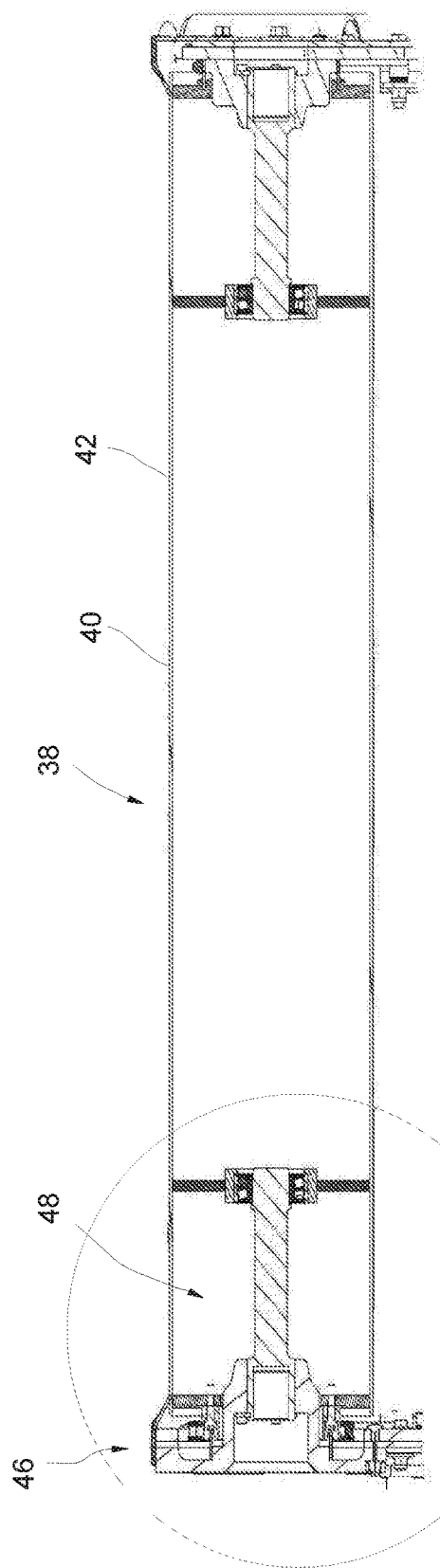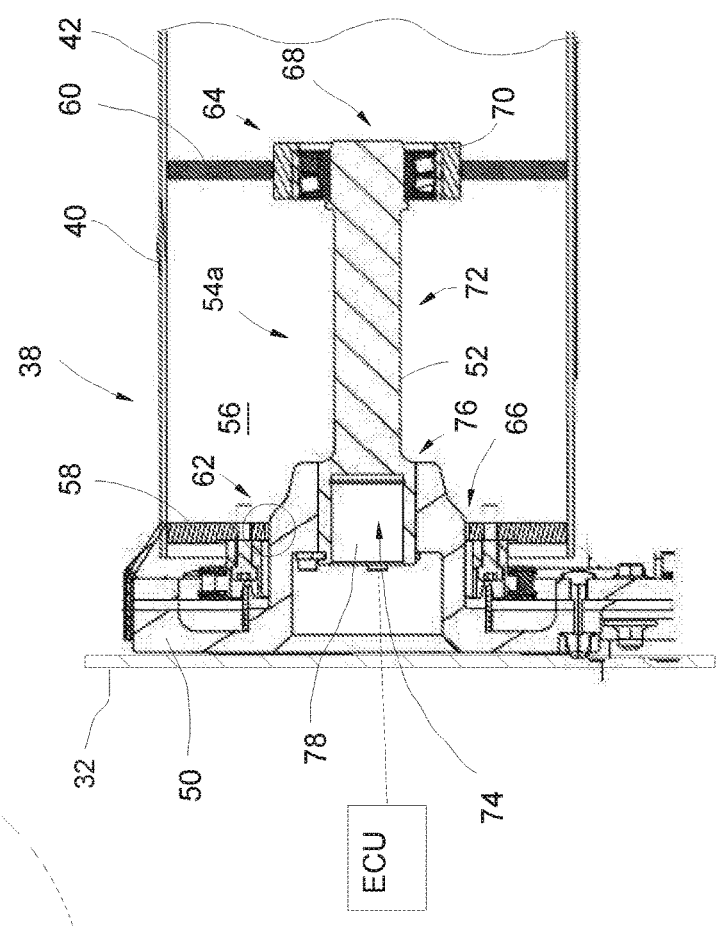

WEIGHING DEVICE AND HARVEST COLLECTING APPARATUS

RELATED APPLICATIONS

This application claims priority to German Patent Application Ser. No. 102017215438.1, filed Sep. 4, 2017, the disclosure of which is hereby incorporated by reference in its entirety.

FIELD OF THE DISCLOSURE

The present disclosure relates to a weighing device for detecting the weight force of a pressed bale on a roll, including at least one weighing means and a harvest collecting apparatus.

BACKGROUND

Weighing devices for detecting the weight force of a pressed bale are known. Conventional weighing devices are complex as they require additional components, are subjected to environmental influences, or have to be protected from environmental influences by protective devices. For example, DE-A1-10241215 discloses a round baler having a weighing device for detecting the weight force of pressed, round bales which is designed to detect the force which a round bale exerts on a bearing element located in the pressing chamber of the round baler. To this end, the weighing device includes a measuring cell which is arranged between the bearing element and a frame of the round baler.

SUMMARY

In a first embodiment of the present disclosure, a weighing device for detecting the weight force of a pressed bale on a roll comprises at least one weighing means. If the weighing means is integrated in a bearing device of the roll, this permits a compact design. The roll may, for example, be a contact roll, a support roll or even a drive roll which may be provided, for example, to support, retain, move or drive the pressed bale on a harvest collecting apparatus such as a baler, a wrapping device, or a combination thereof. The baler may be used for producing round-cylindrical bales or pressed bales, and the wrapping device may be used for wrapping a pressed bale with a wrapping material such as a net or film. The combination of a baler and a wrapping device may be used, for example, in the agricultural and industrial field. In this case, the pressed bale may be directly in contact with the roll or cooperate indirectly therewith, for example, by the pressed bale bearing against one or more belts or chains wound around the roll or two or more such rolls. The weighing device may be provided on one or more rolls or cooperate with one or more rolls. Similarly, one or more bearing device(s) or weighing means may be provided.

If the weighing means comprises a bearing pin or if the weighing means is configured as a bearing pin, this contributes to a compact design. Thus, the detection of the weight force of the pressed bale may be carried out as directly as possible on a component which is subjected to the load by the weight force. To this end, the weighing means or the bearing pin comprises at least one sensor, in particular a Hall sensor or is configured as such. This may also reduce the number of components and aid a compact construction or a direct determination of the weight force. As an alternative to the embodiment as a bearing pin, it is also conceivable that the weighing means comprises an axle or shaft or is designed as an axle or shaft which bears the roll or about which the roll is rotatably arranged. In particular, the use or design as a Hall sensor, or in the manner of a Hall sensor, simplifies the combination of a bearing function with a measuring or sensor function.

A Hall sensor uses the Hall effect for measuring magnetic fields. To this end, the Hall sensor may comprise at least one magnet which is moved according to a loading state of the weighing means or the bearing pin. The magnetic flow density may be altered thereby, resulting in an electrical signal which may be transmitted, for example, to a control or regulating device in order to be evaluated there in order for one or more function(s) of the harvest collecting apparatus to be correspondingly controlled or regulated.

The weighing means is received at one end fixedly in terms of rotation in a carrier flange which is able to be connected to a frame of a harvest collecting apparatus, so that a secure connection of the weighing means to the frame may be produced and thus contributing to a stable bearing of the roll. Additionally or alternatively, the weighing means may extend from the carrier flange into a hollow interior of the roll and be received in the interior of the roll by a bearing supporting the roll. The weighing means is, therefore, received or mounted in the interior of the roll, whereby the weighing means or its bearing is protected by the roll or a hollow cylinder of the roll from environmental influences such as, for example, moisture, dust or harvested crops.

It is conceivable to mount the roll in a fixed manner. In particular, for receiving or for driving (i.e., rotating) a pressed bale or even in order to be adapted to a circumference of the pressed bale, however, the roll may be provided to be rotatable about the bearing device or the weighing means.

In some applications, it may be advantageous to provide a sleeve which, together with the weighing means, is received fixedly in terms of rotation by the carrier flange, the weighing means extending through said sleeve.

An overload protection device may contribute to protecting the weighing means or the bearing pin from loads which are too great, such as may be produced, for example, by particularly heavy pressed bales. Such an overload protection device may be configured, in particular, such that in the case of an overload it connects the roll at least temporarily or partially, in particular non-positively, to the carrier flange so that no load or only a part of the load is received by the weighing means or the bearing pin.

To this end, a gap may be provided between the bearing pin and the sleeve, in the case of an overload said gap being reduced such that the weighing means, in particular, comes to bear non-positively against the sleeve. This may be advantageous, in particular, in applications in which a rotation of the roll, even in the case of an overload, is intended to be at least substantially freely possible in the case of a roll in or on a pressing chamber of a baler. Alternatively or additionally, a gap may be provided between the roll and the carrier flange in the case of an overload said gap being reduced such that the roll comes to bear directly or indirectly, in particular non-positively, against the carrier flange. Such a design may be advantageous if, in the case of an overload, a rotation of the roll does not have to be ensured, for example, since this does not limit or only slightly limits a function of the harvest collecting apparatus.

In particular, the roll is appropriate for supporting a pressed bale, in particular in or on a harvest collecting apparatus.

Such a weighing device may be used on a harvest collecting apparatus, in particular an agricultural or industrial baler, including a press for forming round-cylindrical pressed bales or a wrapping device for wrapping a pressed bale with a wrapping material including at least one roll for supporting a bale. The harvest collecting apparatus may comprise one or more weighing device(s). It may be provided that the weighing device is provided in the pressing chamber of a baler or adjacent to such a pressing chamber. However, it may also be provided that the weighing device is configured to determine the weight force of a pressed bale received on a wrapping device. To this end the weighing device may be arranged, for example, on or adjacent to a receiving device or even a transport device for transferring a pressed bale from a first position, for example, on a pressing chamber of a baler, into a second position, for example on or in a wrapping device.

In the case of a combination apparatus comprising a pressing chamber and a wrapping device, it is conceivable that a weighing device is provided both in or on the pressing chamber and in or on the wrapping device. However, it may also be provided that a weighing device is provided either in or on the pressing chamber or in or on the wrapping device. The pressed bale may, in particular, be a bale of harvested crops. However, it is also conceivable that the pressed bale is made up of refuse, paper, cloth or woven fabric, cotton, tobacco, etc.

It is particularly advantageous if, at the time of the detection of a weight force of the pressed bale, the pressed bale is supported at least approximately exclusively on the roll.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2 is an enlarged view of a roll of a receiving device of the wrapping device, FIG. 2a is an enlarged view of the region A of FIG. 2.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
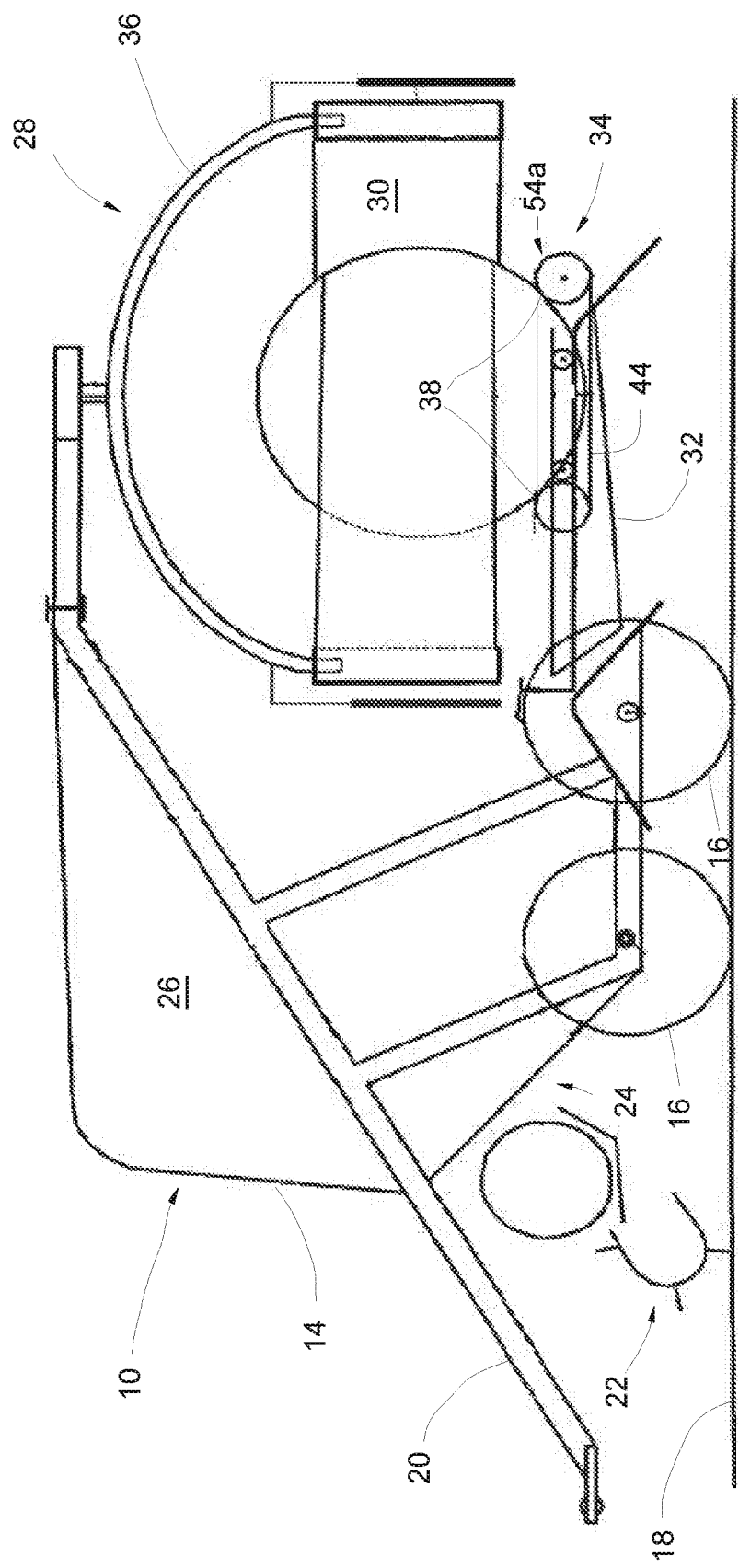
FIG. 1 is a schematic side view of a harvest collecting apparatus configured in the manner of a baler with a wrapping device.

A harvest collecting apparatus 10 in the manner of an agricultural baler for pressing a round-cylindrical pressed bale 12 is shown in FIG. 1. The baler includes a frame 14 which is supported by means of wheels 16 on the ground 18 and which is able to be connected by means of a tow bar 20 to a traction vehicle such as, for example, a tractor (not shown).

Relative to a forward direction of travel, a receiving device 22 for receiving and supplying harvested crops is located on a front lower face of the frame 14 in a known manner. The receiving device conveys cut harvested crops via an inlet 24 into a pressing chamber 26.

Additionally, the harvest collecting apparatus 10 includes a wrapping device 28 for wrapping a pressed bale 12 formed in the baler with a wrapping material 30 such as, for example, a film. The wrapping device 28 has a frame 32, a winding table or a receiving device 34 for receiving the bale 12 to be wrapped and winding arms 36 which may be set in motion for wrapping the pressed bale 12 with the wrapping material 30 by means of a suitable drive (not shown).

The receiving device 34 in turn has two rolls 38, one of which is shown enlarged in FIG. 2. The two rolls 38 may support the pressed bale 12 when the pressed bale 12 is transferred from the pressing chamber 26 into its wrapping position on the wrapping device 28, during the wrapping of the bale 12 with wrapping material 30, to this end to cooperate with a belt 44 wound around the rolls 38, or around a hollow cylinder 42 at least substantially determining an outer surface 40 of the roll 38. The hollow cylinder 42 may be produced in the known manner from a metal material, for example, such as a metal plate, or from a different suitable material including a plastics material.

Now reference is also made to FIG. 2a in which a left-hand region denoted by A in FIG. 2 of one of the rolls 38 is shown enlarged. Hereinafter, reference is only made to this region, wherein a region on the right-hand side, also shown in FIG. 2, is correspondingly configured according to the present embodiment. According to the view, the roll 38 in its left-hand end region 46 is attached via a bearing device 48 to a carrier flange 50 and a bearing pin 52 onto the frame 32 of the wrapping device 28. The bearing device 48 also has a weighing device 54a as is described in more detail hereinafter. According to the embodiment shown, a weighing device 54a is also provided in the right-hand region and the second roll 38 is accordingly configured. It is, however, conceivable that only one of the rolls 38 cooperates on one side or on both sides with a weighing device 54a.

In the interior 56 of the hollow cylinder 42 in each case two substantially disk-shaped projections 58, 60 are fixedly connected respectively by one central circular opening 62, 64 to the hollow cylinder 42, wherein the projection arranged in the end region 46 of the roll 38 or the hollow cylinder 42, is denoted hereinafter as a boundary projection 58 and the projection arranged further into the interior 56 of the hollow cylinder 46 relative to the boundary projection 58 is denoted as the bearing projection 60.

The bearing pin 52, which is received fixedly in terms of rotation in the carrier flange 50, extends from the carrier flange 50 into the interior 56 of the hollow cylinder 42. The carrier flange 50 in turn extends through the opening 62 in the boundary projection 58 such that at least one gap 66 is provided between the bearing pin 52 and the boundary projection 58 when a pressed bale 12 is not received by the rolls 38. An end region 68 of the bearing pin 52 opposing the carrier flange 50 bears a bearing 70 in the manner of a rolling bearing or ball bearing which is received by the opening 64 in the bearing projection 60 such that the hollow cylinder 42 or the roll 38 may rotate about the bearing pin 60 and the roll 38 is supported on the bearing pin 52 by the bearing 70.

For determining the weight force of a pressed bale 12 received or supported by the roll 38 or by the belt 44 wound around the roll, the bearing pin 52 is configured as a weighing means 70, which is appropriate for determining a weight force or load acting on the bearing pin 52. To this end, the bearing pin 52 comprises a sensor 74 which is configured in the manner of a known Hall Effect sensor. A receiver 78 is provided in a top region 76 of the bearing pin 52. The receiver transmits values received by the sensor 70 to a control or regulating device (ECU), shown only by way of indication.

In normal operation, the weight force of a pressed bale 12 supported directly or indirectly on the rolls 38 is received via the hollow cylinder 42, the bearing projections 60 and the bearings 70 about which the rolls 38 rotate. The bearings 70 transmit the acting forces in turn to the bearing pin 52 where the sensor(s) 74 determine(s) the corresponding load. The boundary projections 58 are not in contact with the bearing pin 52. If an overload situation occurs, for example, by the supported pressed bale 12 exceeding a permitted weight force, which may occur in the case of damp harvested crops, the bearing pin 52 is deformed such that ultimately it comes to bear partially or fully against the boundary projection 58. As a result, the weight force is no longer fully borne by the bearing pin(s) 52 but at least partially transmitted via the carrier flange 50 to the boundary projection(s) 58. If the bearing pin 52 bears against the carrier flange 50, a rotation of the roll 38 is limited and optionally prevented.

Figure 3:
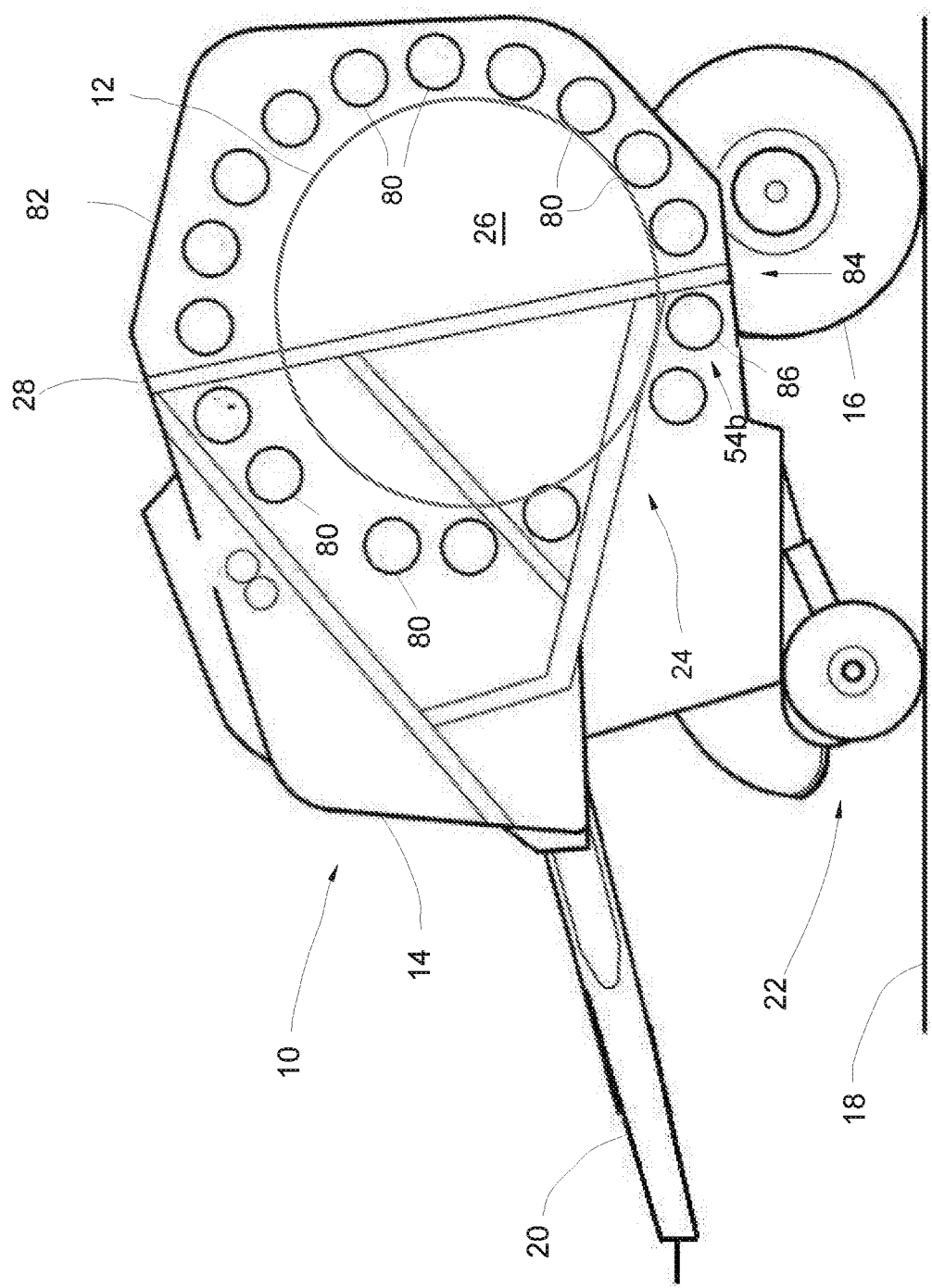
FIG. 3 is a second embodiment of a harvest collecting apparatus which is configured as a baler with a pressing chamber of fixed size.

A second embodiment of a harvest collecting apparatus 10 in the manner of a press for forming round-cylindrical pressed bales is now shown in FIG. 3 of the drawings. As far as possible, for simplification, the same reference numerals are used for components of the same or at least comparable function or design in this embodiment. The harvest collecting apparatus 10 has a frame 14 which is supported by means of wheels 16 on the ground 18 and is able to be attached by means of a tow bar 20 to a tractive vehicle (not shown) such as a tractor.

The pressing chamber 26 of the baler 10 is configured to be fixed in size and the press 10 has a plurality of pressing rolls 80 which extend parallel to one another (by way of example here only a few rolls 80 have been provided with the reference numeral 80) and which during the formation of a pressed bale 12 are placed on a circular arc and at least some thereof are driven. The pressing rolls 80 serve, in addition to pressing and shaping, in particular, for producing a rotation or maintaining a rotation of the pressed bale 12 arranged in the pressing chamber 26. Moreover, a pivotable ejection flap 82 is provided in a region of the harvest collecting apparatus 10, to the rear relative to the forward direction of travel. The ejection flap releases an opening 84 for ejecting a pressed bale 12 from the pressing chamber 26. For clarification, in the drawings the ejection flap 82 is shown in a slightly open position.

A pressing roll 80 is arranged at the lowest point relative to the pressing chamber 26 or upstream of the opening 82 relative to the forward direction of travel. The pressed bale 12 generally and, at least at the time of the weight force determination being at least approximately exclusively supported thereon, and which is denoted hereinafter for clarification as a roll 86, also cooperates with a weighing device 54b.

Figure 4:
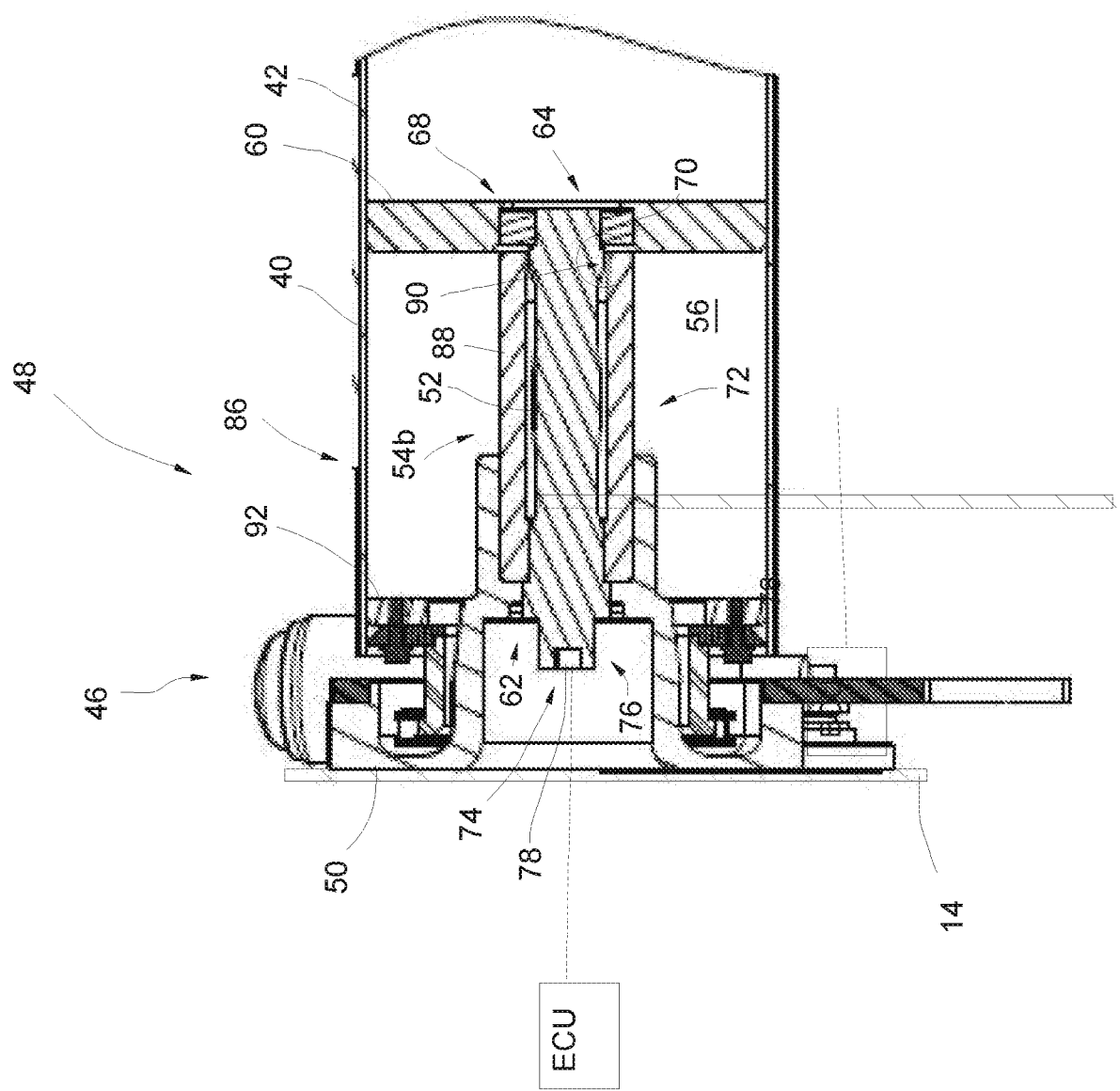
FIG. 4 is a view of a roll arranged in the pressing chamber of a harvest collecting apparatus shown in FIG. 3.

Reference is now made to FIG. 4 which shows a roll 86 in a view according to FIG. 2b, wherein corresponding components are cited with the same reference numerals as in the above embodiment. The roll 86 has a hollow cylinder 42 with an internal bearing projection 60 which is fixedly connected to the hollow cylinder 42 and rotatably supported on a bearing 70. Moreover, a carrier flange 50 is connected to the frame 14 of the press and receives a bearing pin 52 fixedly in terms of rotation. At its end region 68 opposing the carrier flange 50, the bearing pin 52 is rotatably received via the bearing 70 in the bearing projection 60. Once again, only the left-hand region of the roll 86 is shown and described, wherein the right-hand region of the roll 86 is correspondingly configured. Moreover, it is conceivable that the bearing pin 52 which is configured as a weighing means 72 is provided in only one region.

Moreover, according to this second embodiment a sleeve 88 is provided. The sleeve receives or surrounds the bearing pin 52 and at one end together with the bearing pin 52 is received fixedly in terms of rotation by the carrier flange 50. At the other end, the sleeve 88 reaches as far as the bearing projection 60 or the opening 64 in the bearing projection 60. At least one gap 90 is provided between the bearing pin 52 and the sleeve 88, when no pressed bale 12 is received by the rolls 38. Moreover, sealing means 92 are provided on the carrier flange 50 and prevent a penetration of foreign bodies or moisture into the interior 56 of the hollow cylinder 42 but at least substantially not support the roll 38 or the hollow cylinder 42.

In normal operation, the weight force of a pressed bale 12 supported on the rolls 38 is received by the hollow cylinder 42, the bearing projections 60 and the bearings 70, about which the roll 86 rotates. The bearings 70 in turn transmit the acting forces to the bearing pin 52 where the sensor 74 determines a corresponding deformation, respectively a loading, of the bearing pin 52. The sleeve 88 is not in contact with the end region 68 of the bearing pin 52. If an overload situation occurs, for example, by the supported pressed bale 12 exceeding a permitted dynamic movement, the bearing pin 52 is thus deformed such that ultimately it or its end region 68 comes to bear against the sleeve 88. As a result, the weight force is no longer fully received or supported by the bearing pin 52 but at least partially transmitted via the sleeve 88 to the carrier flange 50. An at least substantially unhindered rotation of the roll 86 is also possible here when the bearing pin 52 and the sleeve 88 come to bear against one another.

Figure 5:
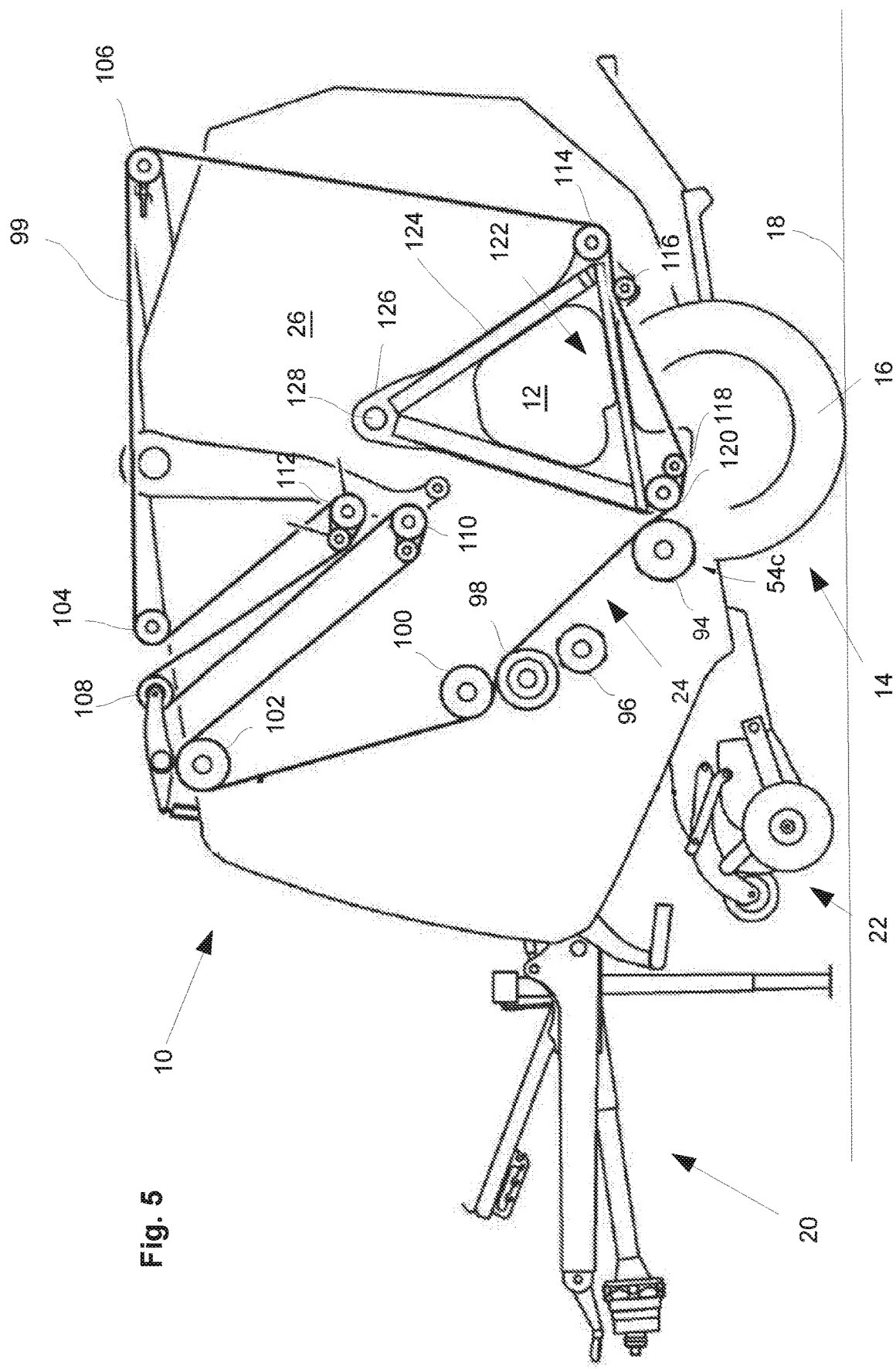
FIG. 5 is a harvest collecting apparatus in a third embodiment which is configured as a baler with a variable pressing chamber.

In FIG. 5, a third embodiment of a harvest collecting apparatus 10 is shown, wherein as far as possible or where applied, reference numerals which correspond to those in the previous figures are used. The harvest collecting apparatus 10 also has in this case a frame 14 which is supported by means of wheels 16 on the ground 18. The harvest collecting apparatus 10 is configured in the manner of a round baler with a variable pressing chamber 26.

A tow bar 20 is provided in order to hook up the harvest collecting apparatus 10 to a tractor, and to be able to pull the harvest collecting apparatus over a field. A receiving device 22 in the form of a pick-up serves for receiving harvested crops located on the ground 16, for example, hay or straw deposited in a swathe. The harvested crops received by the receiving device 22 are supplied via an inlet 24 to a pressing chamber 26 and rolled and bound there into a spiral shape to form a round-cylindrical pressed bale 12 and subsequently deposited on the ground 16.

A lower stationary roll 94 and two upper rolls 96, 98 are positioned at the inlet 24 of the pressing chamber 26. The pressing chamber 26 is also formed by an endless pressing means or a belt 99 which, according to the present embodiment, is designed in the manner of two adjacent pressing belts and is guided around a number of fixed rolls 100, 102, 104, 106 and movable rolls 108, 110, 112, 114, 116, 118, 120.

Four rolls 114-120 of the movable rolls 108-120 are mounted freely rotatably in a lower region 122 of a delta-shaped carrier 124, which is pivotably articulated about its upper tip 126 around an axle 128 extending horizontally and transversely to the forward direction and which by means of an actuator (not shown) is able to be moved from the bale forming position shown in FIG. 5 into a bale ejecting position pivoted upwardly to the rear.

A weighing device 54c is provided on the lower stationary roll 94, a pressed bale 12 being at least temporarily approximately exclusively supported thereon, and the weighing device is configured so as to correspond to the weighing device 54b shown in FIG. 4.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A harvest collecting apparatus comprising:
   a frame;
   a roll rotatable relative to the frame and operable to support a round pressed bale, the roll including a hollow cylinder defining an interior;
   a bearing projection fixedly connected to the roll and disposed within the interior of the hollow cylinder;
   a bearing supported by the bearing projection
   a carrier flange attached to the frame;
   a bearing pin attached to the carrier flange and extending to an end region, with the end region rotatably supported by the bearing, and with the roll rotatable relative to the bearing pin; and
   a sensor attached to the bearing pin and operable to detect deformation of the bearing pin in response to a weight force applied to the roll by the round pressed bale.

2. The harvest collecting apparatus set forth in claim 1, wherein the sensor is a hall effect sensor.

3. The harvest collecting apparatus set forth in claim 1, further comprising a sleeve fixedly attached to the carrier flange and surrounding the bearing pin, with the bearing pin extending through the sleeve.

4. The harvest collecting apparatus set forth in claim 3, wherein the bearing pin and the sleeve define a radial gap disposed therebetween when the weight force is less than an overload limit, and wherein the radial gap is reduced with the roll supported by the carrier flange when the weight force is greater than the overload limit.

5. The harvest collecting apparatus set forth in claim 1, further comprising a boundary projection fixedly connected to the roll and disposed within the interior of the hollow cylinder and proximate the carrier flange.

6. The harvest collecting apparatus set forth in claim 5, wherein the boundary projection and the carrier flange define a gap therebetween when the weight force is less than an overload limit, and wherein the gap is reduced with the roll supported by the carrier flange hen the weight force is greater than the overload limit.

* * * * *